United States Patent
Yang et al.

(10) Patent No.: US 10,711,746 B2
(45) Date of Patent: Jul. 14, 2020

(54) INTAKE MANIFOLD AND ENGINE HAVING THE SAME

(71) Applicants: HYUNDAI MOTOR COMPANY, Seoul (KR); KIA MOTORS CORPORATION, Seoul (KR)

(72) Inventors: Il Suk Yang, Hwaseong-si (KR); Seung Hoon Lee, Suwon-si (KR); Junghyeok Lim, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/178,032

(22) Filed: Nov. 1, 2018

(65) Prior Publication Data

US 2020/0063699 A1 Feb. 27, 2020

(30) Foreign Application Priority Data

Aug. 27, 2018 (KR) .................. 10-2018-0100096

(51) Int. Cl.
*F02M 35/10* (2006.01)

(52) U.S. Cl.
CPC ............ *F02M 35/10262* (2013.01); *F02M 35/10006* (2013.01); *F02M 35/1038* (2013.01); *F02M 35/10222* (2013.01)

(58) Field of Classification Search
CPC ........... F02D 23/00; F02D 2001/006; F02D 2200/0406; F02D 41/0007; F02D 41/14; F02M 26/08; F02M 26/13; F02M 30/10; F02M 30/10006; F02M 30/10222; F02M 30/10262; F02M 30/1038

USPC .................. 123/559.1, 568.13, 568.17
See application file for complete search history.

(56) References Cited

U.S. PATENT DOCUMENTS

| | | | | |
|---|---|---|---|---|
| 5,988,149 A | * | 11/1999 | Gates | F02D 41/0065 123/497 |
| 6,014,961 A | * | 1/2000 | Gates | F02M 35/10222 123/497 |
| 6,850,833 B1 | * | 2/2005 | Wang | F02D 41/0055 123/568.12 |
| 2008/0149079 A1 | * | 6/2008 | Jefford | F02B 47/08 123/568.11 |
| 2011/0232614 A1 | * | 9/2011 | Emerick | F02M 26/16 123/568.17 |
| 2014/0222318 A1 | * | 8/2014 | Ramappan | F02D 41/0072 701/108 |
| 2014/0324323 A1 | * | 10/2014 | Gates | F02D 41/0072 701/108 |
| 2015/0090236 A1 | * | 4/2015 | Chen | F02D 41/0077 123/568.12 |

* cited by examiner

*Primary Examiner* — John Kwon
*Assistant Examiner* — Johnny H Hoang
(74) *Attorney, Agent, or Firm* — Morgan, Lewis & Bockius LLP

(57) ABSTRACT

An intake manifold may include a manifold inlet connected with an intake line into which fresh air flows and a recirculation line into which exhaust gas recirculation (EGR) gas flows; a manifold pressure sensor for measuring pressure of fluid flowing through the manifold inlet; and a sensor housing fluidly communicating with the manifold inlet and including a mounting space in which the manifold pressure sensor is mounted.

9 Claims, 4 Drawing Sheets

INTAKE MANIFOLD AND ENGINE HAVING THE SAME

CROSS-REFERENCE TO RELATED APPLICATION

This application claims the benefit of priority to Korean Patent Application No. 10-2018-0100096 filed in the Korean Intellectual Property Office on Aug. 27, 2018, the entire contents of which are incorporated herein by reference.

TECHNICAL FIELD

The present disclosure relates to an intake manifold and an engine having the same. More particularly, the present disclosure relates to an intake manifold and an engine having the same that can prevent a manifold pressure sensor for measuring pressure in the intake manifold from freezing by fresh air and high temperature and humidity EGR gas.

BACKGROUND

Recently, as environmental problems have become an important issue, interest in methods of efficiently processing exhaust gas of the vehicle has increased. Nitrogen oxide (NOx) included in exhaust gas is considered as main air pollutants, and a number of researches are being conducted to reduce emission of NOx.

An exhaust gas recirculation (EGR) system mounted in a vehicle reduces noxious exhaust gases of the vehicle. Generally, the amount of NOx in the exhaust gas is increased in an oxygen rich air mixture, and the air mixture is combusted well. Therefore, the exhaust gas recirculation system reduces the amount of NOx in the exhaust gas as a consequence of a part (e.g., 5-20%) of the exhaust gas being recirculated to the air mixture in order to reduce the oxygen ratio in the air mixture and so hinder combustion.

An LP-EGR (low pressure EGR) system is one of the exhaust gas recirculation (EGR) systems. The LP-EGR system recirculates the exhaust gas passing through the turbine of the turbocharger to an intake path of an upstream side of the compressor.

However, the exhaust gas recirculated by the EGR system has high temperature and humidity. Therefore, condensed water is generated in an intake manifold when high temperature and humidity recirculated exhaust gas and the external air having a low temperature are mixed. The condensate water has very high acidity by various material included in exhaust gas.

If the condensate water flows into a cylinder of an engine, combustion of the engine becomes unstable. And various parts (i.e., compressor wheel, or compressor housing, and so on) are corroded by the condensate water having high acidity.

Further, a manifold absolute pressure sensor (MAP sensor) for measuring pressure of external air flowing into the intake manifold is mounted in the intake manifold, condensed water is frozen in surface of the manifold pressure sensor when temperature of external air is very low such cold weather.

As such, when the condensed water is frozen in the surface of the manifold pressure sensor, a pressure aperture for measuring pressure of external air formed in the manifold pressure sensor is blocked, thereby accuracy of pressure measured by the MAP sensor is deteriorated or there is a case that pressure of external air cannot be measured.

Further, when the parts (i.e., compressor wheel, or compressor housing, and so on) is frozen by freezing of condensed water, temperature of external air measured by the MAP sensor is distorted.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide an intake manifold and an engine having the same that can prevent a manifold pressure sensor for measuring pressure in the intake manifold from freezing by fresh air and high temperature and humidity EGR gas.

An intake manifold according to an exemplary embodiment of the present disclosure may include a manifold inlet connected with an intake line into which fresh air flows and a recirculation line into which EGR (exhaust gas recirculation) gas flows; a manifold pressure sensor for measuring pressure of fluid flowing through the manifold inlet; and a sensor housing fluidly communicating with the manifold inlet and including a mounting space in which the manifold pressure sensor is mounted.

The sensor housing may be fluidly connected with the manifold inlet through an inflow line, and fluidly connected with a surge tank that temporarily stores the fresh air flowing in through the intake line and the EGR gas flowing in through the recirculation line through an outflow line.

The inflow line may be branched off between a downstream portion of the intake line and an upstream portion of the recirculation line and merged into the sensor housing.

The inflow line may be formed to be downwardly inclined toward the sensor housing.

The outflow line may be formed to be downwardly inclined toward the surge tank from the sensor housing.

A cross-sectional area of the inflow line may be smaller than a cross-sectional area of the manifold inlet.

An intake manifold according to another exemplary embodiment of the present disclosure may include a manifold inlet connected with an intake line into which fresh air flows and a recirculation line into which EGR (exhaust gas recirculation) gas flows; a manifold pressure sensor for measuring pressure of fluid flowing through the manifold inlet; and a sensor housing fluidly communicating with the manifold inlet, and including a mounting space in which the manifold pressure sensor is mounted by branching the sensor housing off from an upstream portion of the recirculation line.

The sensor housing may include a housing body which the mounting space is formed therein; an inflow line which connects the intake line and the housing body with each other; and an outflow line which connects the housing body and a surge tank with each other, the surge tank temporarily storing fresh air flowing through the intake line and EGR gas flowing through the recirculation line.

The inflow line may be branched off between a downstream portion of the intake line and an upstream portion of the recirculation line and merged into the sensor housing.

The inflow line may be formed to be downwardly inclined toward the sensor housing with respect to a flow direction of the fresh air flowing through the manifold inlet.

The outflow line may be formed to be downwardly inclined toward the surge tank from the sensor housing.

A cross-sectional area of the inflow line may be smaller than a cross-sectional area of the manifold inlet.

According to an exemplary embodiment of the present disclosure, since the manifold pressure sensor is mounted in the mounting space of the sensor housing formed in the intake manifold, it is possible to prevent the manifold pressure sensor from being frozen by condensed water.

Further, since freezing of the manifold pressure sensor can be prevented, thereby malfunction of the manifold pressure sensor is prevented and the manifold pressure sensor can accurately measure pressure and temperature in the intake manifold.

Further, since the sensor housing for mounting the manifold pressure sensor functions as a resonator, accuracy of pressure measured by the manifold pressure sensor can be improved.

BRIEF DESCRIPTION OF THE DRAWINGS

The drawings are provided for reference in describing exemplary embodiments of the present disclosure, and the spirit of the present disclosure should not be construed only by the accompanying drawings.

DETAILED DESCRIPTION

Figure 1:
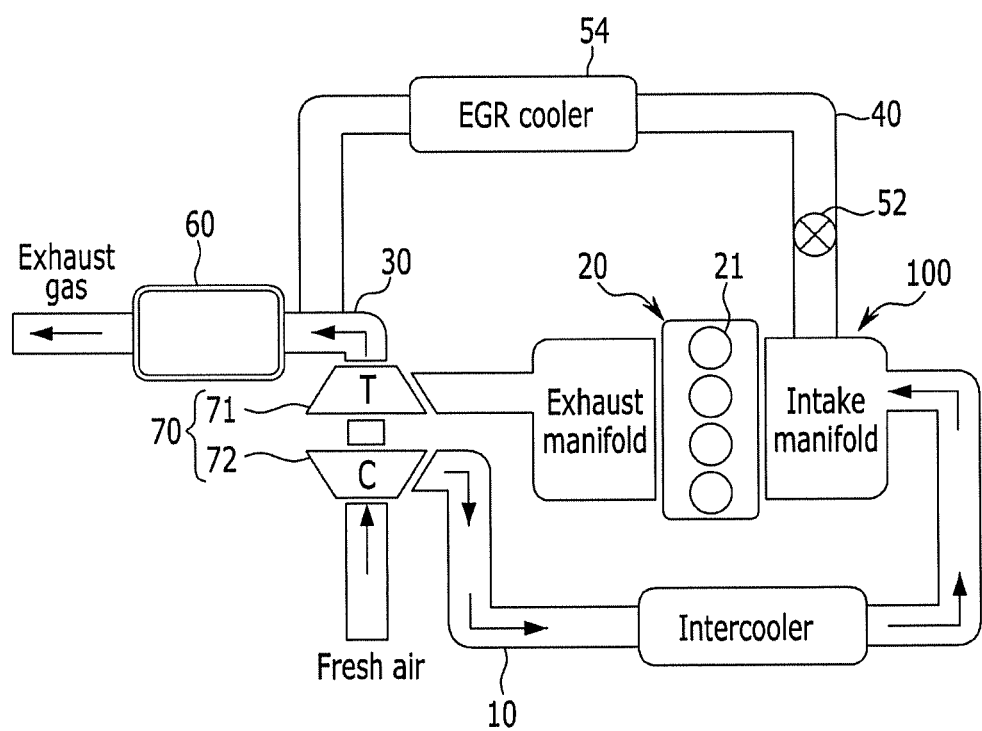
FIG. 1 is a schematic view illustrating an engine system according to an exemplary embodiment of the present disclosure.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

In order to clearly describe the present disclosure, portions that are not connected with the description will be omitted. Like reference numerals designate like elements throughout the specification.

In addition, the size and thickness of each configuration shown in the drawings are arbitrarily shown for better understanding and ease of description, but the present disclosure is not limited thereto. In the drawings, the thickness of layers, films, panels, regions, etc., are exaggerated for clarity.

Hereinafter, an engine system in which an intake manifold according to an exemplary embodiment of the present disclosure is applied will be described in detail with reference to accompanying drawings.

FIG. 1 is a schematic view illustrating an engine system according to an exemplary embodiment of the present disclosure.

As shown in FIG. 1, an engine system according to an exemplary embodiment of the present disclosure may include an engine 20 including a plurality of combustion chambers 21 generating driving torque by burning fuel, an intake line 10 into which fresh air supplied to the combustion chamber 21 flows, an intake manifold 100 in which distributes the fresh air flowing through the intake line 10 to the plurality of combustion chamber 21, an exhaust line 30 into which exhaust gas discharged from the combustion chamber 21 flows, and a recirculation line 40 which is branched off from the exhaust line 30 and merged into the intake manifold 100.

An exhaust gas purification device that purifies the exhaust gas exhausted from the combustion chamber 21 is disposed in the exhaust line 30. The exhaust gas purification apparatus 80 may include an LNT (lean NOx trap), a diesel oxidation catalyst (diesel oxidation catalyst), and a DPF (diesel particulate filter).

The engine system according to an exemplary embodiment of the present disclosure may further include an exhaust gas recirculation (EGR) device in which a part of the exhaust gas exhausted from the combustion chamber 21 is resupplied to the combustion chamber 21. The EGR device includes a recirculation line 40 that is branched off from the exhaust line 30 and merged into the intake manifold 100, an EGR cooler 54 disposed in the recirculation line 40, and an EGR valve 52 disposed in the recirculation line 40. The EGR cooler 54 cools EGR gas recirculated through the recirculation line 40. An amount of the EGR gas is adjusted by opening degree of the EGR valve 52.

The engine system may include a turbocharger 70 that compresses the fresh air flowing in through the intake line 10 and the recirculation gas flowing in through the recirculation line 40 and supplies the compressed air to the combustion chambers 21. The turbocharger 70 includes a turbine 71 that is disposed in the exhaust line 30 and rotated by exhaust gas exhausted from the combustion chamber 21, and a compressor 72 that is disposed in the intake line 10 and rotated by rotation force of the turbine and turbocharging the external air and the recirculated exhaust gas.

The air flowing in through the intake line 10 is supplied to the combustion chamber 21 through the intake manifold 100. A throttle valve is disposed in an upstream portion of the intake manifold 100, and an amount of the fresh air supplied to the combustion chamber 21 is adjusted by opening degree of the throttle valve.

The intake manifold 100 includes a plurality of pipe that distributes the fresh air flowing in through the throttle valve to be distributed to the combustion chamber 21, and uniformly distributes the fresh air to the plurality of combustion chamber in multi cylinder engine.

Hereinafter, the intake manifold according to an exemplary embodiment of the present disclosure will be described in detail with reference to accompanying drawings.

Figure 2:
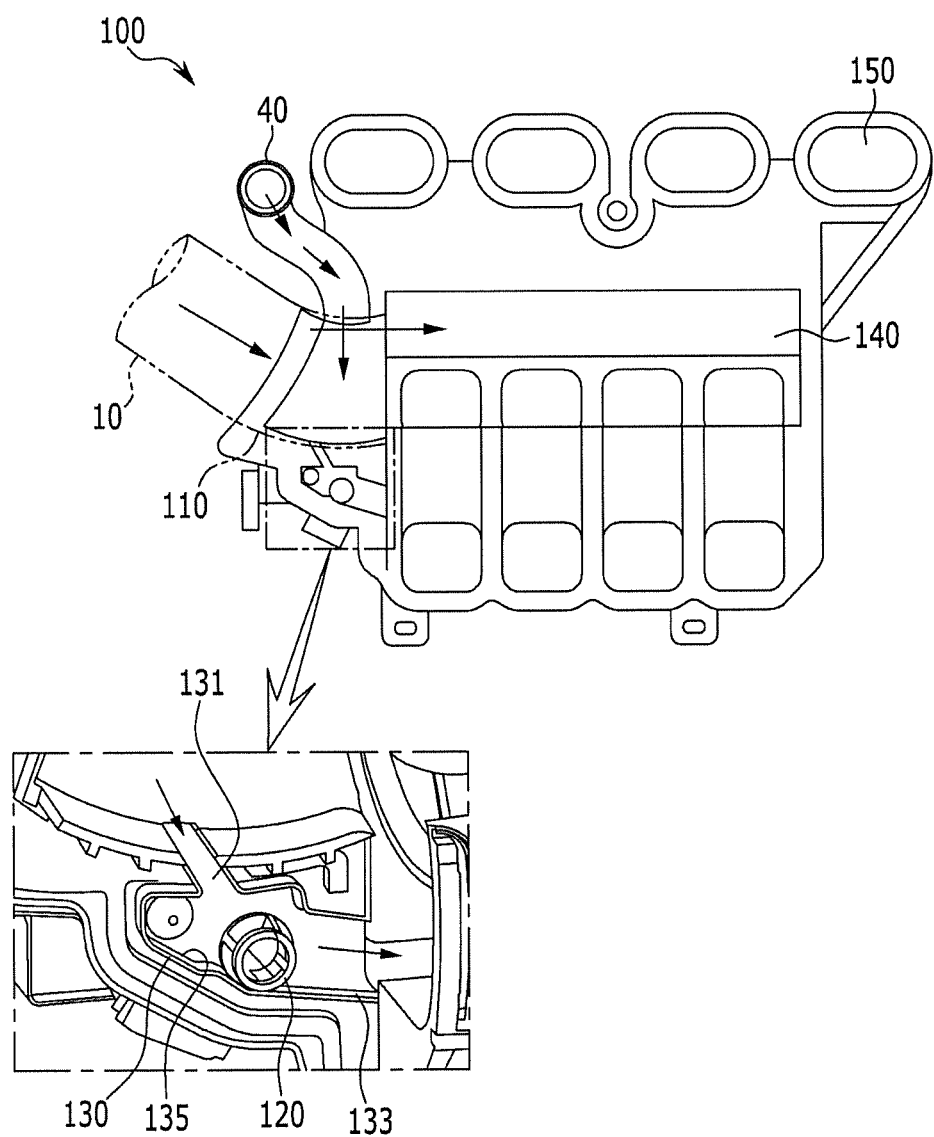
FIG. 2 is a drawing illustrating an intake manifold according to an exemplary embodiment of the present disclosure.
Figure 3:
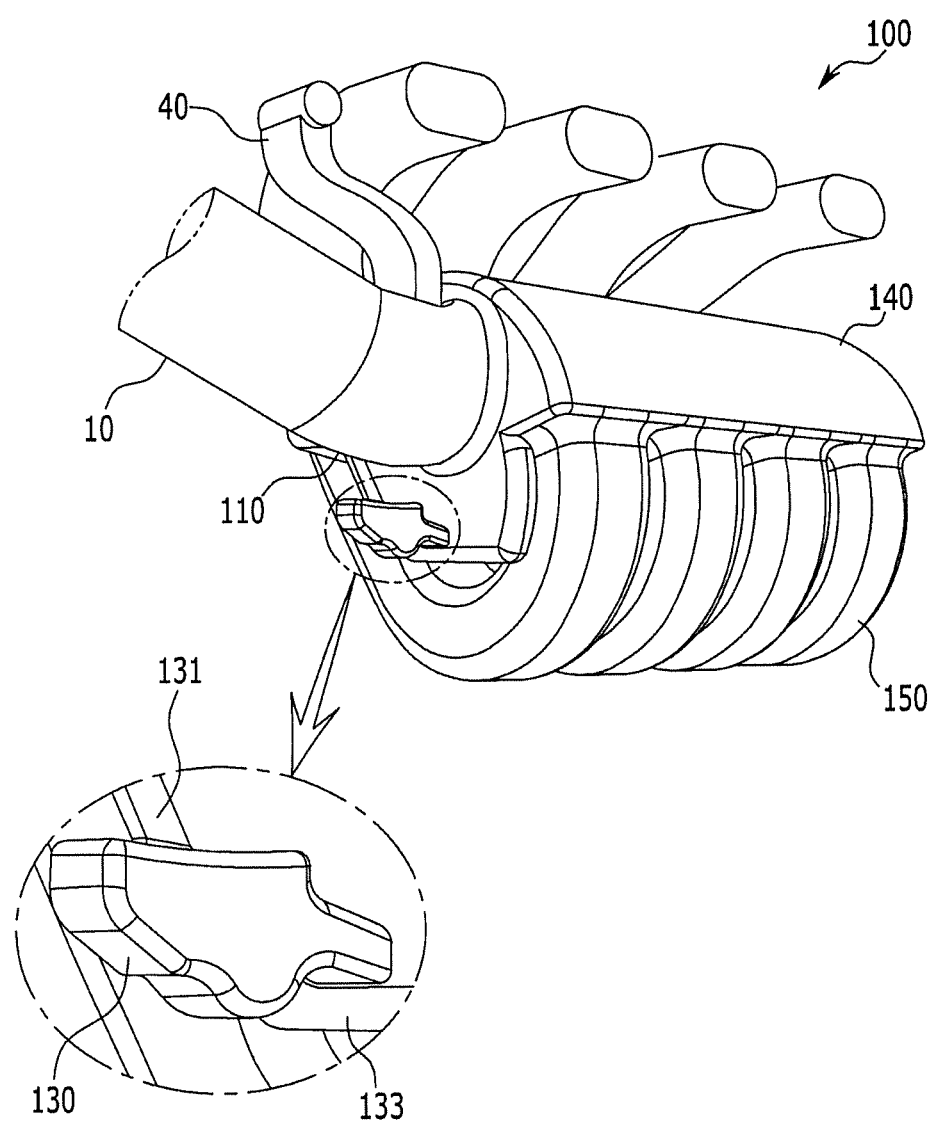
FIG. 3 is a drawing illustrating an intake manifold according to an exemplary embodiment of the present disclosure, taken in a different direction.
Figure 4:
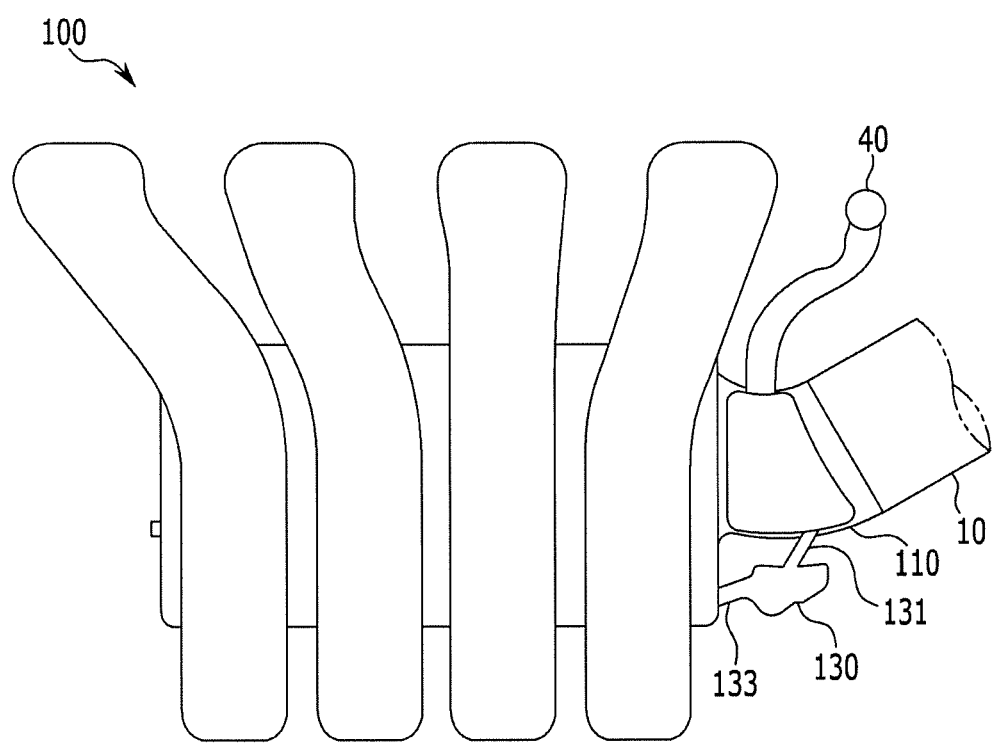
FIG. 4 is a drawing illustrating an intake manifold according to an exemplary embodiment of the present disclosure, taken in a different direction.

FIG. 2 to FIG. 4 are drawings illustrating an intake manifold according to an exemplary embodiment of the present disclosure.

Referring to FIG. 2 to FIG. 4, the intake manifold 100 according to an exemplary embodiment of the present disclosure may include a manifold inlet 110 that is fluidly connected with the intake line 10 into which fresh air flows and the recirculation line 40 into which EGR gas flows, a manifold pressure sensor 120 for measuring pressure of fluid (e.g., fresh air, and/or EGR gas) flowing in through the manifold inlet 110, and a sensor housing 130 that fluidly is communicated with the manifold inlet 110 and forms a mounting space 135 for mounting the manifold pressure sensor 120.

The manifold pressure sensor 120 is mounted in the mounting space 135 formed in the sensor housing 130.

The fresh air flowing in through the intake line 10 and the EGR gas flowing in through the recirculation line 40 (hereinafter, refer to as "mixed gas") flow in to a surge tank 140 formed in a manifold main body passing through the manifold inlet 110, and the mixed air is distributed to the plurality of combustion chamber 21 from the surge tank 140 through runners 150.

An inflow line 131 and an outflow line 133 are connected with the sensor housing 130. That is, the sensor housing 130 is connected with the manifold inlet 110 through the inflow line 131, and connected with the surge tank 140 temporarily storing the fresh air and the EGR gas through the outflow line 133.

Preferably, the intake line 10 is connected with the manifold inlet 110 at an upstream portion of the recirculation line 40, and the inflow line 131 is branched off between a downstream portion of the intake line 10 and an upstream portion of the recirculation line 40 and merged into the sensor housing 130. Since the inflow line 131 is branched off from the manifold inlet 110 between the intake line 10 and the recirculation line 40, only fresh air flows into the mounting space 135 of the sensor housing 130 before condensed water is generated by mixing cold fresh air and the EGR gas having high temperature and humidity. Accordingly, it is possible to prevent the condensed water from being frozen at the manifold pressure sensor 120.

Further, the inflow line 131 is formed to be downwardly inclined toward the sensor housing 130 with respect to a flow direction of the fresh air flowing through the manifold inlet 110. And the outflow line 133 is formed to be downwardly inclined toward the surge tank 140 from the sensor housing 130. At this time, the inflow line 131 and the outflow line 133 may be downwardly inclined in the same direction.

The mounting space 135 in which the manifold pressure sensor 120 is mounted is disposed in the sensor housing 130. The mounting space 135 may function as a resonator. For this, it is preferable that the volume of the mounting space 135 is sufficiently large. The volume of the mounting space 135 may be optimized based on a desired volume of the mounting space 135 for the pressure of the inflowing fresh air to be constantly maintained and for the manifold pressure sensor 120 to accurately measure the pressure of the fresh air.

Meanwhile, it is preferable that a cross-sectional area of the inflow line 131 is sufficiently small comparing to a cross-sectional area of the manifold inlet 110. At this time, the cross-sectional area of the inflow line 131 and the cross-sectional area of the manifold inlet 110 may be optimized based on a desired amount of inflowing air or EGR gas. Since the cross-sectional area of the inflow line 131 is sufficiently small comparing to the cross-sectional area of the manifold inlet 110, minimum fresh air and EGR gas enough to measuring pressure and temperature flow into the mounting space 135 of the sensor housing 130. Accordingly, it is possible that the condensed water flowing into the mounting space 135 of the sensor housing 130 is minimized.

Hereinafter, an operation of the engine system according to an exemplary embodiment of the present disclosure will be described in detail with reference to accompanying drawings.

The fresh air flowing through the intake line 10 flows into the surge tank 140 of the intake manifold 100 passing though the manifold inlet 110, and some exhaust gas (EGR gas) exhausted from the combustion chamber 21 flows into the surge tank 140 passing through the exhaust line 30, the recirculation line 40 and the manifold inlet 110.

Some fresh air flows into the mounting space 135 of the sensor housing 130 passing through the inflow line 131, and the manifold pressure sensor 120 mounted in the mounting space 135 of the sensor housing 130 measures pressure of the fresh air flowing into the intake manifold 100. The pressure measured by the manifold pressure sensor 120 may be transmitted to an ECU (engine control unit) of a vehicle.

At this time, since the inflow line 131 is branched off between the downstream portion of the intake line 10 and the upstream portion of the recirculation line 40 and merged into the sensor housing 130, the fresh air flows into the mounting space 135 of the sensor housing 130 before condensed water is generated by mixing the cold fresh air and the EGR gas having high temperature and humidity. Accordingly, it is possible to prevent the condensed water from flowing into the mounting space 135 of the sensor housing 130, and malfunction of the manifold pressure sensor 120 can be prevented by freezing of the condensed water.

Further, since the mounting space 135 disposed in the sensor housing 130 functions as a resonator, pressure of the fresh air flowing into the mounting space 135 of the sensor housing 130 constantly maintains and pressure of the fresh air can be accurately measured.

Further, even though the condensed water generated by mixing the fresh air and the EGR gas flows into the mounting space 135 of the sensor housing 130 by various reasons, since the inflow line 131 and the outflow line 133 are formed to be downwardly declined, the condensed water flowing into the mounting space 135 through the inflow line 131 is easily discharged to the surge tank 140 through the outflow line 133. Accordingly, it is possible to prevent the condensed water from being pooled in the mounting space 135.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An intake manifold comprising:
    a manifold inlet connected to an intake line into which fresh air flows and a recirculation line into which exhaust gas recirculation (EGR) gas flows;
    a manifold pressure sensor for measuring pressure of fluid flowing through the manifold inlet; and
    a sensor housing fluidly communicating with the manifold inlet and including a mounting space in which the manifold pressure sensor is mounted,
    wherein the sensor housing is fluidly connected to the manifold inlet through an inflow line and fluidly connected to a surge tank through an outflow line, the surge tank temporarily storing the fresh air flowing through the intake line and the EGR gas flowing through the recirculation line, and
    wherein the inflow line is branched off between a downstream portion of the intake line and an upstream portion of the recirculation line, and merged into the sensor housing.

2. The intake manifold of claim 1, wherein:
    the inflow line is formed to be downwardly inclined toward the sensor housing.

3. The intake manifold of claim 1, wherein:
the outflow line is formed to be downwardly inclined toward the surge tank from the sensor housing.

4. The intake manifold of claim 1, wherein:
a cross-sectional area of the inflow line is smaller than a cross-sectional area of the manifold inlet.

5. An intake manifold comprising:
a manifold inlet connected to an intake line into which fresh air flows and a recirculation line into which exhaust gas recirculation (EGR) gas flows;
a manifold pressure sensor for measuring pressure of fluid flowing through the manifold inlet; and
a sensor housing fluidly communicating with the manifold inlet, and including a mounting space, in which the manifold pressure sensor is mounted, by branching the sensor housing off from an upstream portion of the recirculation line,
wherein the sensor housing includes:
   a housing body which the mounting space is formed therein;
   an inflow line which connects the intake line and the housing body to each other; and
   an outflow line which connects the housing body and a surge tank to each other, the surge tank temporarily storing fresh air flowing through the intake line and EGR gas flowing through the recirculation line, and
wherein the inflow line is branched off between a downstream portion of the intake line and an upstream portion of the recirculation line, and merged into the sensor housing.

6. The intake manifold of claim 5, wherein:
the inflow line is formed to be downwardly inclined toward the sensor housing with respect to a flow direction of the fresh air flowing through the manifold inlet.

7. The intake manifold of claim 5, wherein:
the outflow line is formed to be downwardly inclined toward the surge tank from the sensor housing.

8. The intake manifold of claim 5, wherein:
a cross-sectional area of the inflow line is smaller than a cross-sectional area of the manifold inlet.

9. An engine comprising an intake manifold, wherein the intake manifold includes:
a manifold inlet connected to an intake line into which fresh air flows and a recirculation line into which exhaust gas recirculation (EGR) gas flows;
a manifold pressure sensor for measuring pressure of fluid flowing through the manifold inlet; and
a sensor housing fluidly communicating with the manifold inlet and including a mounting space in which the manifold pressure sensor is mounted,
wherein the sensor housing is fluidly connected to the manifold inlet through an inflow line and fluidly connected to a surge tank through an outflow line, the surge tank temporarily storing the fresh air flowing through the intake line and the EGR gas flowing through the recirculation line, and
wherein the inflow line is branched off between a downstream portion of the intake line and an upstream portion of the recirculation line, and merged into the sensor housing.

\* \* \* \* \*